US011976530B1

(12) United States Patent
Pruitt et al.

(10) Patent No.: US 11,976,530 B1
(45) Date of Patent: May 7, 2024

(54) PIPE WIPER BOX

(71) Applicant: PRUITT TOOL & SUPPLY CO., Fort Smith, AR (US)

(72) Inventors: Grant Pruitt, Fort Smith, AR (US); Cris Braun, Van Buren, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 133 days.

(21) Appl. No.: 17/698,356

(22) Filed: Mar. 18, 2022

Related U.S. Application Data

(63) Continuation of application No. 17/020,081, filed on Sep. 14, 2020, now Pat. No. 11,280,152, which is a continuation of application No. 16/038,013, filed on Jul. 17, 2018, now Pat. No. 10,774,610, which is a continuation-in-part of application No. 14/536,067, filed on Nov. 7, 2014, now Pat. No. 10,024,129, which is a continuation-in-part of application No. 13/199,196, filed on Aug. 22, 2011, now Pat. No. 8,973,652.

(51) Int. Cl.
*E21B 33/08* (2006.01)
*B08B 9/023* (2006.01)
*E21B 12/06* (2006.01)

(52) U.S. Cl.
CPC .............. *E21B 33/08* (2013.01); *B08B 9/023* (2013.01); *E21B 12/06* (2013.01)

(58) Field of Classification Search
CPC .......... E21B 33/08; E21B 12/06; B08B 9/023
See application file for complete search history.

(56) References Cited

U.S. PATENT DOCUMENTS 2,718,021 A * 9/1955 Baebel .................... E21B 33/08 166/84.1
4,982,787 A * 1/1991 Reddoch ................ E21B 33/08 175/84
5,170,853 A * 12/1992 Mason .................... E21B 33/08 175/84

* cited by examiner

*Primary Examiner* — Nicole Coy
(74) *Attorney, Agent, or Firm* — Schrantz Law Firm, PLLC; Stephen D. Schrantz

(57) ABSTRACT

The pipe wiper assembly of the present invention assists with wiping the pipe as the pipe is removed from the hole ("tripped out"). The pipe passes through the two pipe apertures of the pipe wiper assembly during the removal. Two upper containment arms adjust between an open position and a closed position within the housing to form the upper pipe aperture. The lower containment lip forms the lower piper aperture. The upper containment arms and lower containment lip partially enclose the housing to prevent the wiper from exiting the wiper storage. The containment arms slideably adjust to eliminate the need for hinges. The removal of the hinges provides for easier storage and transportation of the pipe wiper assembly. The removal of hinges also reduces manufacturing costs of the pipe wiper assembly.

9 Claims, 7 Drawing Sheets

PIPE WIPER BOX

CROSS-REFERENCE TO RELATED APPLICATIONS

This application claims priority to and is a continuation of U.S. patent application Ser. No. 17/020,081 entitled "PIPE WIPER BOX" that was filed on Sep. 14, 2020 which is a continuation of U.S. patent application Ser. No. 16/038,013 entitled "PIPE WIPER BOX" that was filed on Jul. 17, 2018 and issued as U.S. Pat. No. 10,774,610 on Sep. 15, 2020 which is a continuation in part of U.S. patent application Ser. No. 14/536,067 entitled "PIPE WIPER BOX" that was filed on Nov. 7, 2014 and issued as U.S. Pat. No. 10,024,129 on Jul. 17, 2018 which is a continuation in part of U.S. patent application Ser. No. 13/199,196 entitled "PIPE WIPER BOX" that issued as U.S. Pat. No. 8,973,652 on Mar. 10, 2015 and was filed on Aug. 22, 2011, the same date that application Ser. No. 13/199,197 entitled "CASING STRIPPER ATTACHMENT" to Grant Pruitt and Cris Braun was filed and the same date that application Ser. No. 13/199,198 entitled "ADAPTER ASSEMBLY" was filed.

STATEMENT REGARDING FEDERALLY SPONSORED RESEARCH OR DEVELOPMENT

Not Applicable.

REFERENCE TO A MICROFICHE APPENDIX

Not Applicable.

Reservation of Rights

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

This invention relates to wiper systems and, more particularly, to a drill pipe wiper system for removing materials from an outer surface of an existing drill pipe while the existing drill pipe is being removed from a ground surface.

Well drilling units are employed in prospecting for gaseous and liquid minerals and for bringing them to the surface. Because of the need for drilling to greater depths, as well as improving the speed of the drilling operation, traditional precision drilling techniques have been superseded by continuous rotary drilling. Rotary drilling utilizes rotational motion of a bit to drill the well bore. The bit is attached to a drill string which is comprised of drill collars, a drill pipe and a kelly joint. At the surface, rotational motion is imparted on the drill string by a rotary table to which the kelly joint is attached.

The drill cuttings produced by the bit that operates at the bottom of the well bore are carried to the earth's surface by circulating drilling fluids, i.e. drilling mud. The drilling fluids are continuously pumped down the well bore. The drill string must be removed periodically to replace worn bits and damaged drill pipe, also known as "tripping out." During tripping out, drilling fluids spill from the drill pipe. Such spillage wastes the drilling fluids and exposes rig workers to unsafe working conditions. To prevent fluid drainage from the drill pipe during tripping out, workers use pipe wipers to wipe the drill pipe as the pipe is removed.

II. Description of the Known Art

Patents and patent applications disclosing relevant information are disclosed below. These patents and patent applications are hereby expressly incorporated by reference in their entirety.

U.S. Pat. No. 5,101,896 issued to Thompson et al. on Apr. 7, 1992 ("the '896 patent") teaches a system for washing and cleaning sections of drill pipe being tripped out of the hole, and the system including a cylindrical housing having a central opening therethrough, the cover sections movable between open and closed positions by hinged joint along one edge, utilizing a system of hydraulic system cylinders, and in the closed position, maintain closed for defining a chamber therewithin. Within the housing chamber, the '896 patent teaches that there is further included a wiper member, which comprises a circular member of rubberized material having a bore through its central axis through which sections of pipe travel during the cleaning process, the bore being a width so as to frictionally engage and wipe the wall of a section of drill pipe. The wiper taught by the '896 patent would be spaced apart from the housing and housed within an annular channel along the inner surface of the housing so that the wiper would be stationary within the housing as the housing is placed in the closed position.

U.S. Pat. No. 4,690,213 issued to Stannard et al. on Feb. 3, 1986 ("the '213 patent") teaches a pipe wiper device and system for stripping fluid from the external surface of tubular articles being pulled from the wellhead of a well. The wiper device taught by the '213 patent includes a container having a carriage movably mounted therein. A pair of wiper pad assemblies taught by the '213 patent are carried by the carriage and movable inwardly and outwardly with respect to each other. A pair of opposed actuators taught by the '213 patent are provided for moving the wiper pad assemblies inward and outward with respect to each other and the connection between the wiper pad assemblies and actuators is such that the wiper pad assemblies and carriage are movable perpendicular to the direction of actuation of the actuators thereby to accommodate sideways movement of the carriage. The actuators taught by the '213 patent are operated by a system that automatically retracts the wiper pad assemblies responsive to rig standpipe pressure so that the wiper pad assemblies retract automatically during drilling.

U.S. Pat. No. 7,621,344 issued to Frey on Nov. 24, 2009 ("the '344 patent") teaches a drill pipe wiper system that includes a plurality of coextensively shaped rectilinear support rails with axially opposed ends with a plurality of openings formed in the opposed ends of the support rails, a plurality of ports penetrating an outer surface of the support rails, and a plurality of spring-loaded latch pins. The system taught by the '344 patent further includes a plurality of coextensively shaped rectilinear end rails and a mechanism for attaching the support rails to a support surface.

U.S. Pat. No. 6,155,388 issued to Brown on Dec. 5, 2000 ("the '388 patent") teaches a wiper device that comprises an elongated conveyor arm which can pivot in a horizontal plane and freely move forward and backward through a limited travel (which movement capabilities are collectively termed "floating" capability). The arm taught by the '388 patent carries a wiper pad assembly on its outer end. The wiper pad assembly taught by the '388 patent can therefore float with the arm to accommodate lateral and to and fro sway of the drill string within the confines of the rig rotary table bushing, when the wiper pads are engaged with the drill string. The arm taught by the '388 patent can be advanced and withdrawn to convey the wiper pad assembly between the operative stripping position over the bushing and a retracted position off to one side of the bushing.

U.S. Pat. No. 5,842,252 issued to Cameron on Dec. 1, 2008 ("the '252 patent") teaches a pipe wiper assembly for stripping fluid from oil and gas well strings which has a pair of rams which can move from a first remote position relative to the pipe forward to a second position contacting and wiping the pipe and forward to a third position when the pipe is not in the oil or gas well to protectively cover the well, the rams being mounted in a carrier which has freedom of movement in any radial direction to allow the rams to be centralized around the oil or gas well string. The unit taught by the '252 patent having alignment guides such that when the rams are returned to the first position the rams and carrier will be centralized over the well bore and the freedom of radial movement is eliminated.

U.S. Pat. No. 5,170,853 issued to Mason et al. on Dec. 15, 1992 ("the '853 patent") teaches a pipe wiper assembly which comprises a first housing for supportingly receiving at least one resilient wiper member, and a second housing supported above the well bore for connecting the first housing to the stack assembly of the drilling unit. The first and second housings taught by the '853 patent are interconnected such that the first housing is selectively movable in response to vertical deviations of the drill pipe as the drill pipe is withdrawn from the vertically extending well bore.

SUMMARY OF THE INVENTION

The pipe wiper assembly of the present invention provides a device that assists with wiping the pipe as the pipe is removed from the hole ("tripped out"). The pipe wiper assembly provides a housing having two pipe apertures, an upper pipe aperture and a lower pipe aperture, that allow the pipe to pass through the housing. The pipe passes through the two pipe apertures of the pipe wiper assembly during the removal. The housing also provides two upper containment arms that adjust between an open position and a closed position within the housing. In the closed position, the two upper containment arms maintain the wiper within the housing. The housing also provides a lower containment lip that forms the lower piper aperture.

The upper containment arms and lower containment lip partially enclose the housing to form the wiper storage. The housing stores a wiper within wiper storage. The wiper has an aperture through which the pipe passes. The diameter of the wiper is larger than the pipe apertures formed by the upper containment arms and lower containment lip. The upper containment arms in the closed position and the lower containment lip prevent the wiper from exiting the wiper storage.

The present invention provides containment arms that slide closed. The sliding of containment arms eliminates the need for hinges. The removal of the hinges provides for easier storage and transportation of the pipe wiper assembly. The removal of hinges also reduces manufacturing costs of the pipe wiper assembly.

The present invention eliminates the need for hinges in the pipe wiper assembly. Hinges of known pipe wiper assemblies are damaged very easily at the drilling site. If the hinges were to fail, the pipe wiper assembly would not function properly. A damaged hinge could decrease drilling thus costing valuable time and money. Furthermore, the hinges from a pipe wiper assembly tend to be damaged such that existing pipe wipers will not function properly. In such instances, the drilling fluid may spill from the pipe wiper assembly costing the drilling team valuable time and money due to the lost drilling fluid. Furthermore, the spilled drilling fluid could remain on the drilling rig floor such that the drilling team must contend with the spilled drilling fluid.

The present invention reduces the downtime of the drilling rig by reducing time expended to trip out the drilling pipe.

The present invention also reduces the amount of equipment required at a drilling site.

It is an object of the present invention to provide an improved pipe wiper assembly that enables ease of use for the end user.

It is an object of the present invention to reduce the equipment needed at a drilling site.

It is another object of the present invention to reduce the costs required for a drilling operation.

It is another object of the present invention to reduce shipping and manufacturing costs required for a drilling operation It is another object of the present invention to allow more efficient tripping out of the drilling pipe.

It is another object of the present invention to decrease the time required to trip out the drilling pipe.

It is another object of the present invention to increase the life of the pipe wiper assembly.

It is another object of the present invention to allow for the trouble free operation of the drilling operation for the rig personnel.

It is another object of the present invention to create a safer work environment for rig personnel.

It is another object of the present invention to simplify the method of assembly of the drilling operation.

It is another object of the present invention to provide a rugged pipe wiper assembly.

It is another object of the present invention to reduce manufacturing costs of a pipe wiper assembly.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 2:
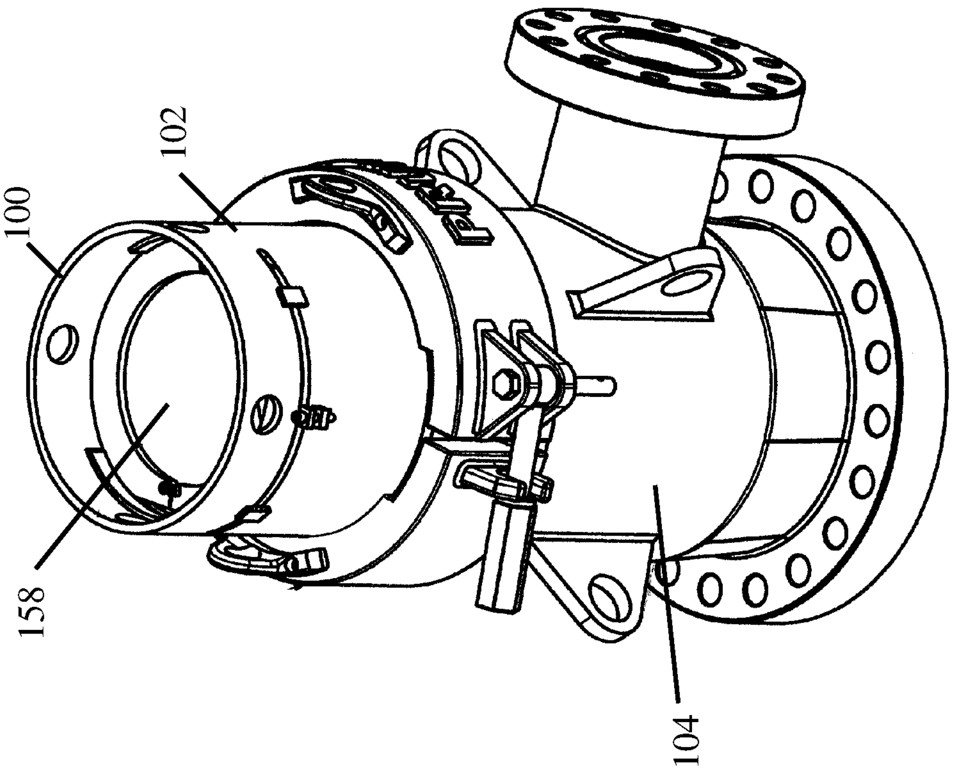
FIG. 2 is an environmental view showing one embodiment of the present invention.
Figure 1:
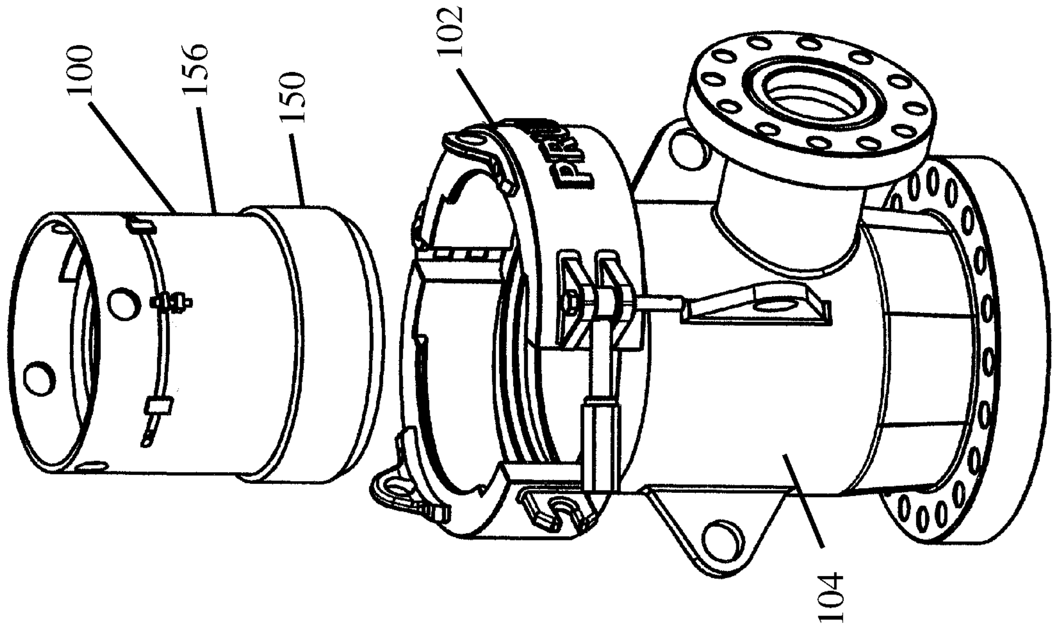
FIG. 1 is an environmental view showing one embodiment of the present invention.

FIGS. 1 and 2 show environmental views of the pipe wiper assembly and its installation within the bowl 104. Base 150 of the pipe wiper assembly is placed within the upper portion of the bowl 104. Clamp 102 secures the housing 100 to the bowl 104 as shown in FIG. 2. Base 150 provides a lip for contacting the clamp to secure the housing 100 within clamp 102. The housing 100 and bowl 104 provide apertures that allow for passage of the drill string through the housing 100 and the bowl 104.

Figure 3:
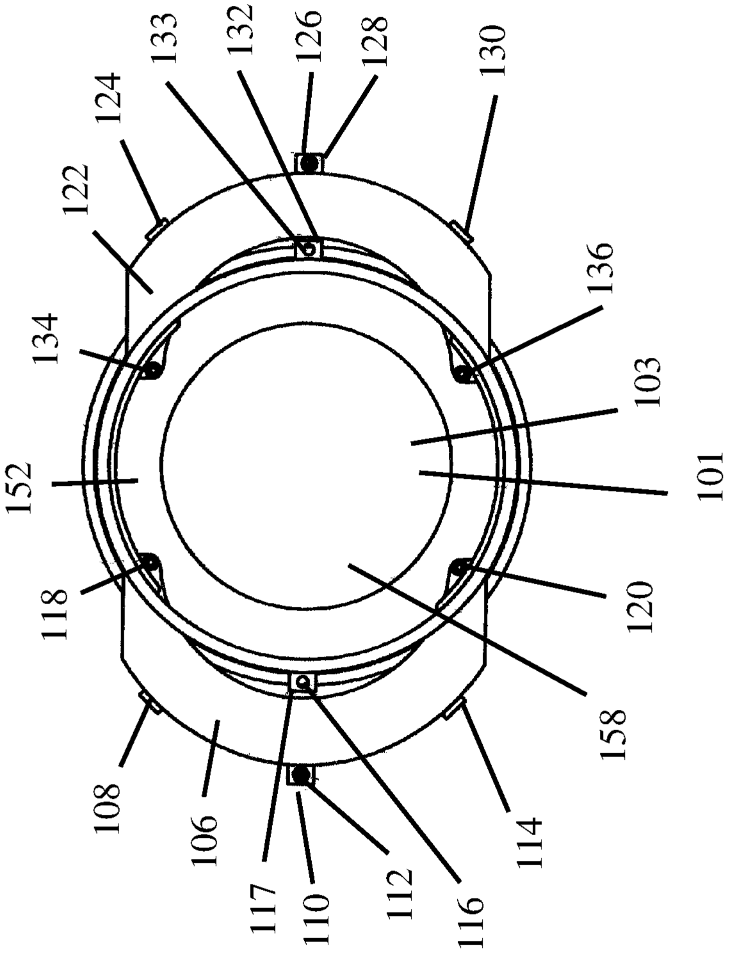
FIG. 3 is a top view showing one embodiment of the present invention.

Referring to FIG. 3, housing 100 provides two pipe apertures, an upper pipe aperture 101 and a lower pipe aperture 103, located interior of an exterior wall 105 of the housing that allow the pipe to pass through the housing 100. The pipe passes through the two pipe apertures 101, 103 of the pipe wiper assembly during the removal. In one embodiment, lower pipe aperture 103 is fixed such that the size of lower pipe aperture is not adjustable. Lower containment lip 152 forms lower pipe aperture 103. Lower containment lip 152 prevents the pipe wiper from falling into the hole.

Figure 5:
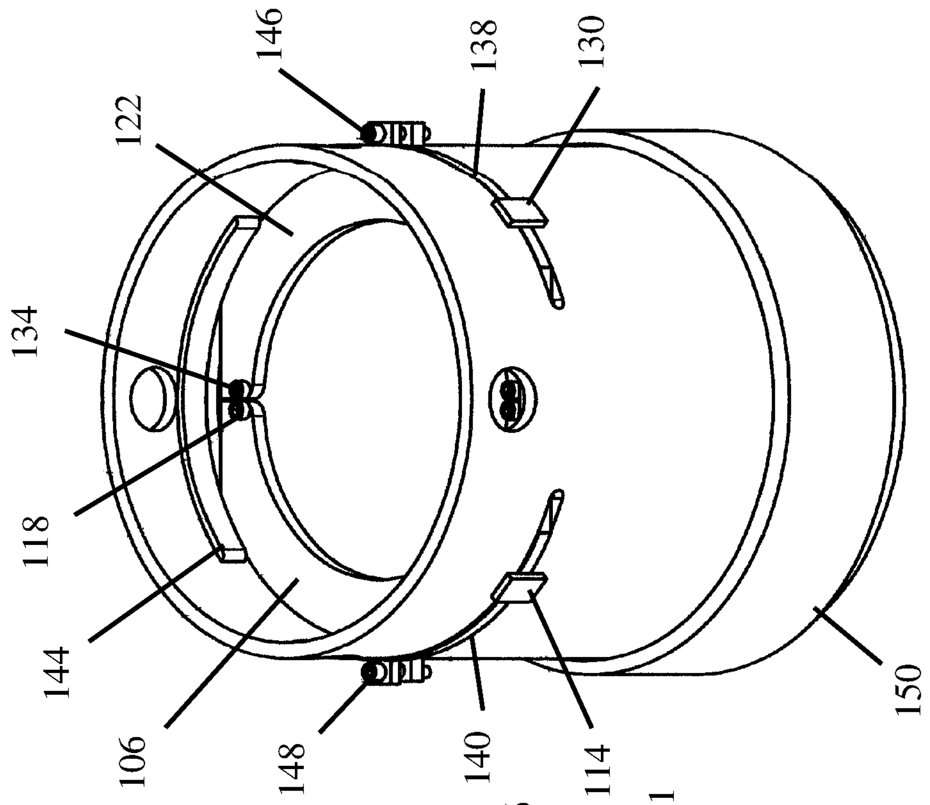
FIG. 5 is a perspective view thereof.

The housing also provides an adjustable upper pipe aperture 101. The size of upper pipe aperture 101 adjusts depending upon the position of the upper containment arms 106, 122. Upper containment arms 106, 122 adjust between an open position and a closed position within the housing. In the open position shown in FIG. 3, upper containment arms 106, 122 increase the size of upper pipe aperture 101. The increased size of upper pipe aperture 101 enables a user to install the pipe wiper. After the pipe wiper is installed within housing 100, the user adjusts the upper containment arms 106, 122 to the closed position to secure the pipe wiper within housing 100 as shown in FIGS. 4 and 5.

In the closed position, the two upper containment arms 106, 122 form the upper pipe aperture 101. The upper containment arms 106, 122 and lower containment lip 152 partially enclose the housing 100 to form the wiper storage 158. The housing 100 stores a wiper within wiper storage 158. The wiper has an aperture through which the pipe passes. The diameter of the wiper is larger than the pipe apertures 101, 103 formed by the upper containment arms 106, 122 in the closed position and lower containment lip 152. The upper containment arms in the closed position and the lower containment lip prevent the wiper from exiting the wiper storage 158 formed by housing 100, upper containment arms 106, 122, and lower containment lip 152.

Figure 4:
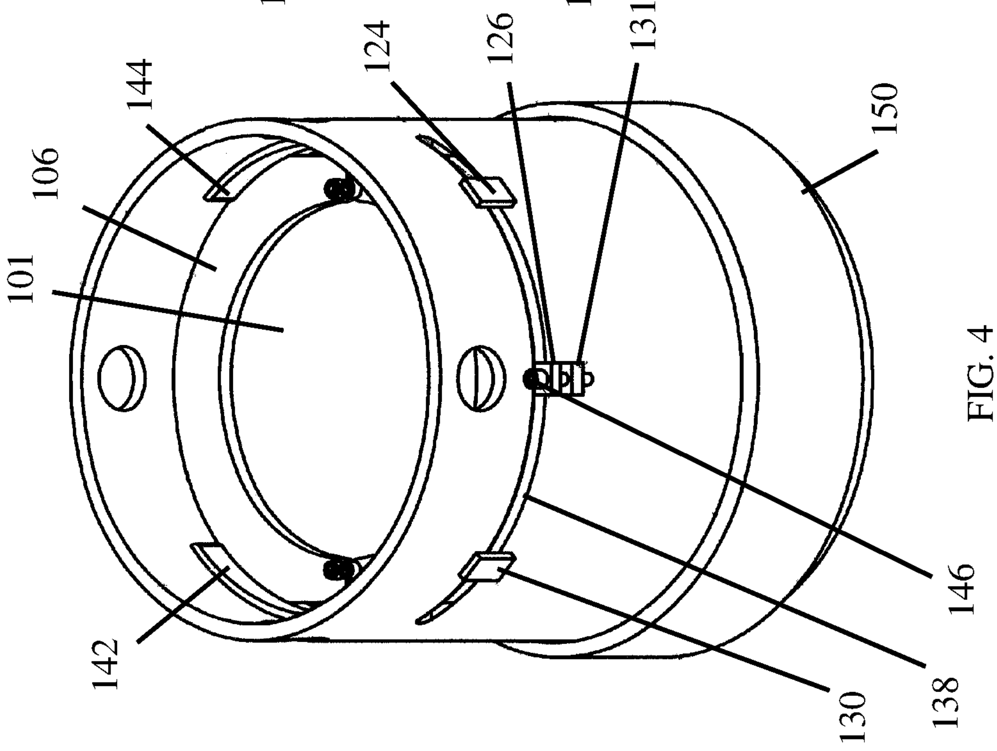
FIG. 4 is a perspective view thereof.

As can be seen in FIG. 3, upper containment arms 106, 122 slideably adjust between an open position shown in FIG. 3 to a closed position shown in FIG. 4. Adjustment apertures 138, 140 enable the adjustment of upper containment arms 106, 122 between the open position and the closed position. The user inserts the upper containment arms 106, 122 into the adjustment apertures 138, 140 to position the containment arms 106, 122 in the closed position.

Stopping fingers 108, 114 of upper containment arm 106 and stopping fingers 124, 130 of upper containment arm 122 assist attaching containment arms 106, 122 to the housing 100. Stopping fingers 108, 114, 124, 130 of containment arms 106, 122 protrude outward from containment arms 106, 122. In one embodiment, stopping fingers 108, 114, 124, 130 extend above and below containment arms 106, 122. The stopping fingers 108, 114, 124, 130 contact housing 100 instead of passing through adjustment apertures 138, 140. Stopping fingers 108, 114, 124, 130 prevent containment arms 106, 122 from passing completely through adjustment apertures 138, 140.

To secure the containment arms in a closed position, the user inserts the containment arms 106, 122 until stopping fingers 108, 114, 124, 130 contact housing 100. Lock bodies 110, 126 of containment arms 106, 122 align with lock bodies 116, 133 of housing 100. Lock bodies 110, 126 provide lock apertures 112, 128. Likewise, lock bodies 116, 132 provide lock apertures 117, 133. The alignment of lock body 110 with lock body 116 also aligns lock apertures 112, 117. The alignment of lock body 126 with lock body 132 aligns lock apertures 128, 133.

Locking fingers 146, 148 insert into lock apertures 112, 117 and lock apertures 128, 133 to secure the containment arms 106, 122 in the closed position. The inserted locking fingers 146, 148 maintain containment arms 106, 122 in the closed position.

Installation fingers 118, 120, 134, 136 of containment arms 106, 122 installed within housing 100 prevent the removal of containment arms 106, 122 from housing 100. In one embodiment, installation fingers 118, 120, 134, 136 removably attach to containment arms 106, 122 to enable a user to install and remove containment arms 106, 122 within housing 100. Installation fingers 118, 120, 134, 136 extend outward from containment arms 106, 122. The installation fingers 118, 120, 134, 136 do not pass through the openings of adjustment apertures 138, 140. Therefore, installation fingers 118, 120, 134, 136 maintain the attachment of containment arms 106, 122 to housing 100 while the installation fingers 118, 120, 134, 136 are installed in containment arms 106, 122.

Figure 7:
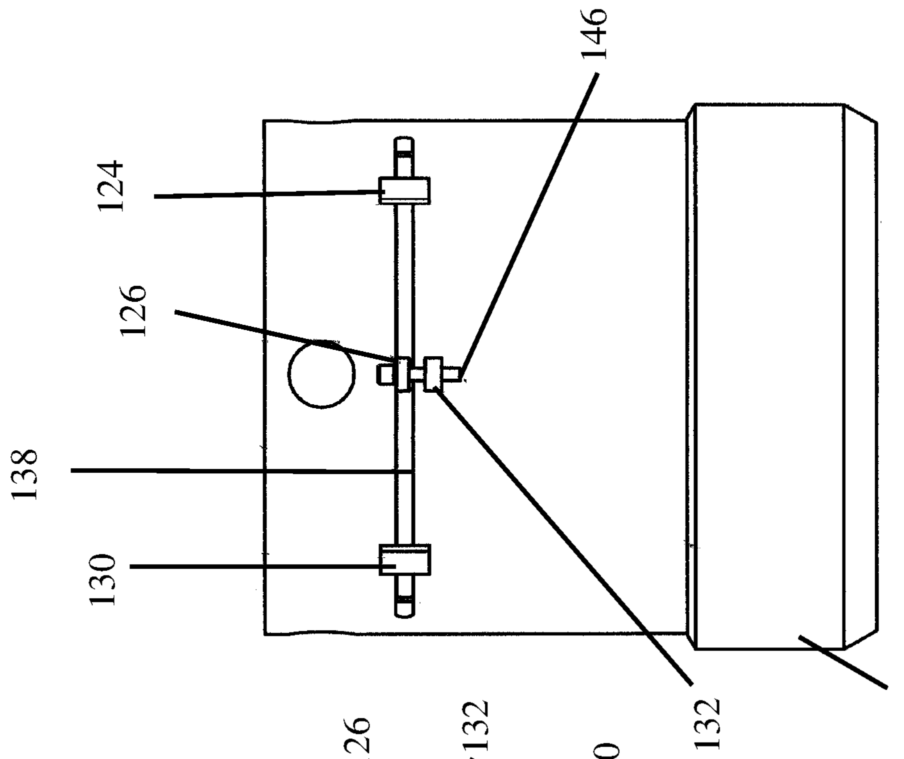
FIG. 7 is a side view thereof.
Figure 6:
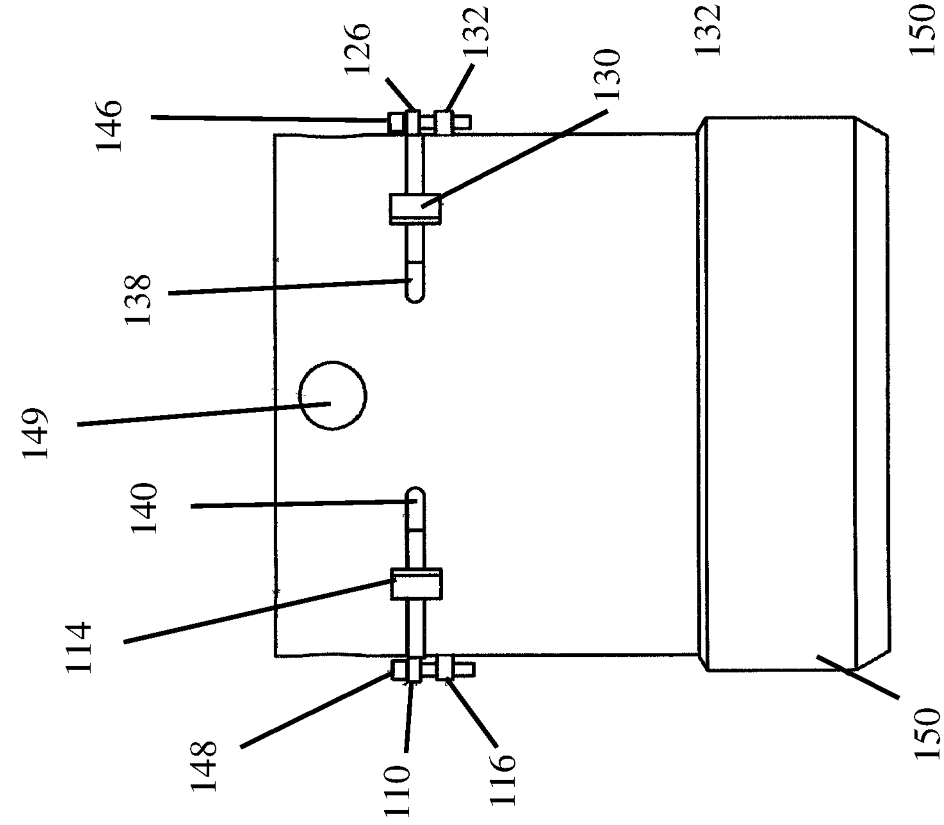
FIG. 6 is a side view thereof.

FIGS. 6 and 7 show side views of containment arms 106, 122 in the closed position. Lifting aperture 149 allows for a lifting arm (not shown) to lift housing 100. Stopping fingers 108, 114, 124, 130 are larger than the openings of adjustment apertures 138, 140. Therefore, stopping fingers 108, 114, 124, 130 prevent removal of the containment arms 106, 122 from housing 100.

FIGS. 6 and 7 also show containment arms 106, 122 secured in the closed position by locking fingers 146, 148. Lock bodies 110, 126 of containment arms 106, 122 extend outward from containment arms 106, 122. Lock bodies 116, 132 extend outward from housing 100. The stopping fingers 108, 114, 124, 130 align the locking apertures 112, 128 of lock bodies 110, 126 with locking apertures 117, 133 of lock bodies 116, 132 when the containment arms 106, 122 are adjusted to the closed position. The alignment of locking apertures 112, 128 with locking apertures 117, 133 enable locking fingers 146, 148 to pass through the locking apertures 112, 117, 128, 133 to secure the containment arms 106, 122 in the closed position.

Figure 8:
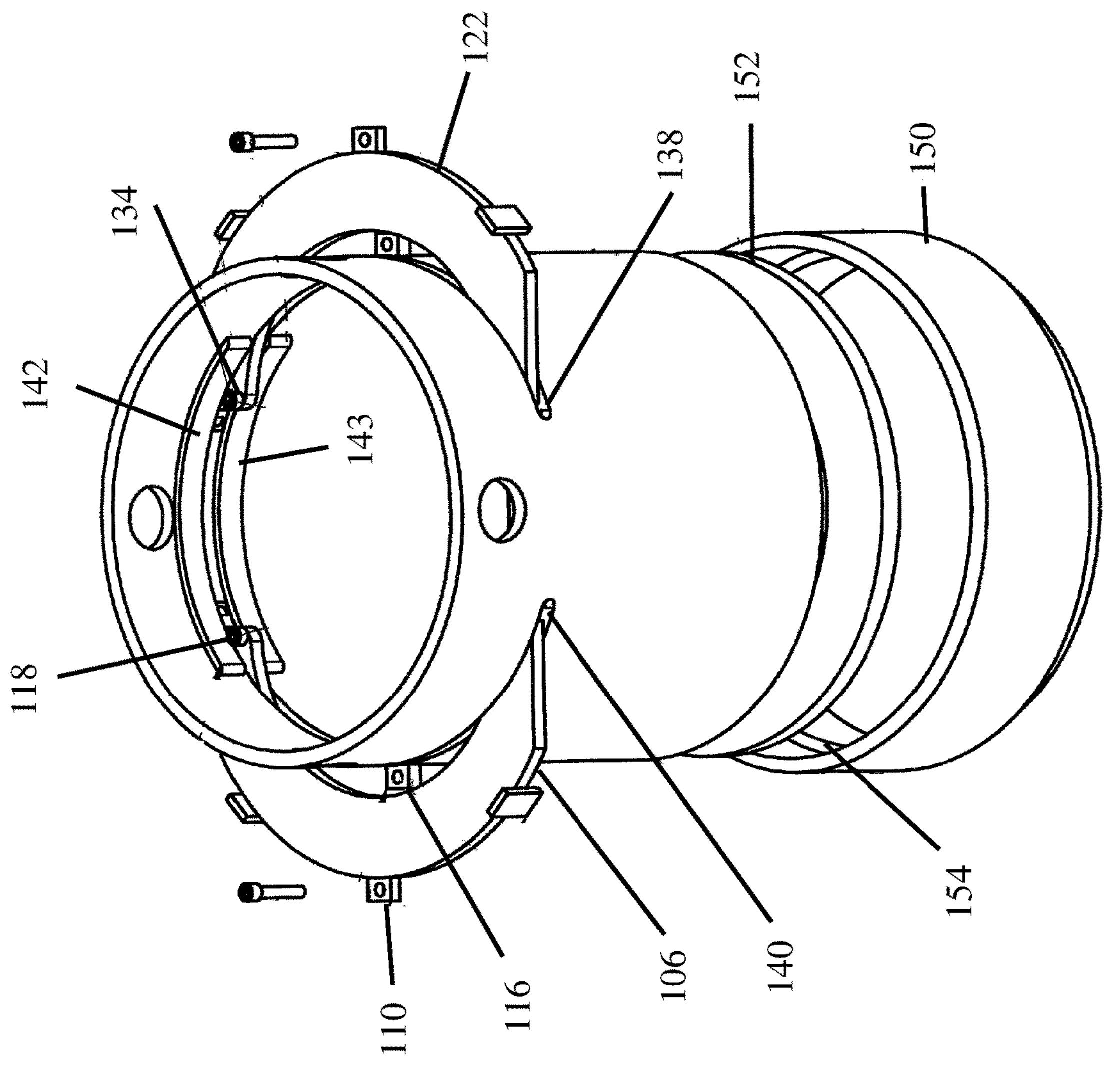
FIG. 8 is an exploded view thereof.

As shown in FIGS. 6, 7, and 8, containment arms 106, 122 slideably adjust between an open position shown in FIG. 8 to a closed position shown in FIGS. 6 and 7. The slideable adjustment of containment arms 106, 122 eliminates the need for hinges for attachment of containment arms 106, 122 of the known art. Because of the activity occurring on the drilling floor, the hinges of the known art damage easily. Such hinge damage prevents users from adjusting the upper pipe aperture 101. The slideable adjustment of containment arms 106, 122 through adjustment apertures 138, 140 eliminate the need for hinged attachment of containment arms 106, 122. Therefore, containment arms 106, 122 adjust between the open position and closed position without the difficulties caused by a hinged attachment of the known art. Upper guides 142, 144 positioned above adjustment apertures 138, 140 assist with the adjustment of containment arms 106, 122. Likewise, lower guides 143 (the lower guide under upper guide 144 is located in a similar location as lower guide 143 on the opposite side) positioned below adjustment apertures 138, 140 assist with the adjustment of containment arms 106, 122.

Figure 9:
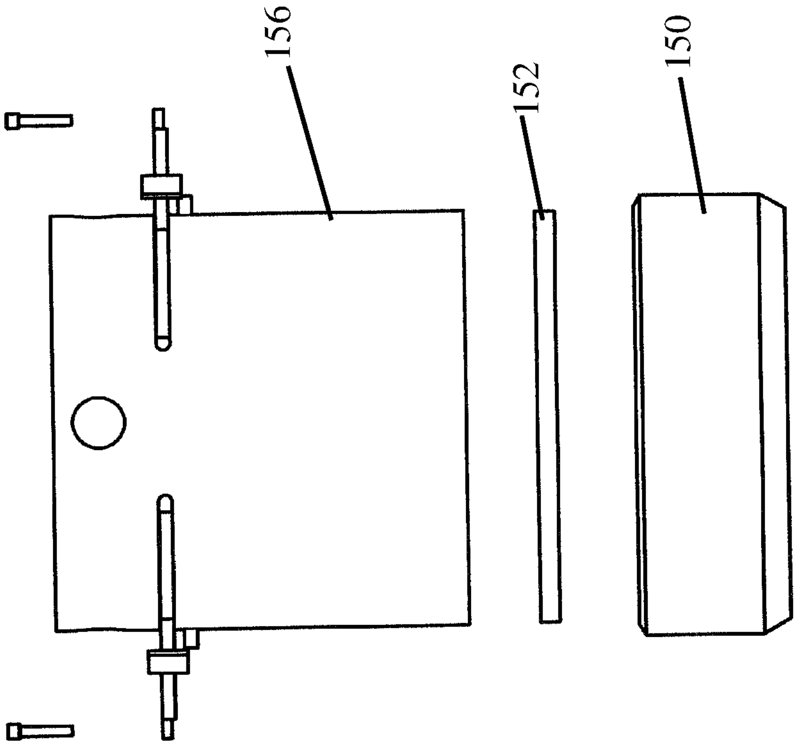
FIG. 9 is an exploded view thereof.

FIG. 9 shows an exploded view of the present invention. Casing 156 attaches to lower containment lip 152 and base 150 to form the housing. In one embodiment, casing 156, lower containment lip 152, and base 150 are welded together to form the housing. Attachment lip 154 provides an area for placement of lower containment lip 152. Lower containment lip 152 has an inner aperture forming lower piper aperture 103 as shown in FIG. 3. Lower pipe aperture 103 allows passage of the pipe (not shown). However, lower containment lip 152 prevents pipe wiper from falling through the bottom of the housing and into the hole.

Base 150 of housing 100 provides an area that extends outward from housing 100. The clamp 102 shown in FIG. 1 contacts base 150 to secure housing 100 with the bowl 104 as shown in FIG. 2.

Figure 11:
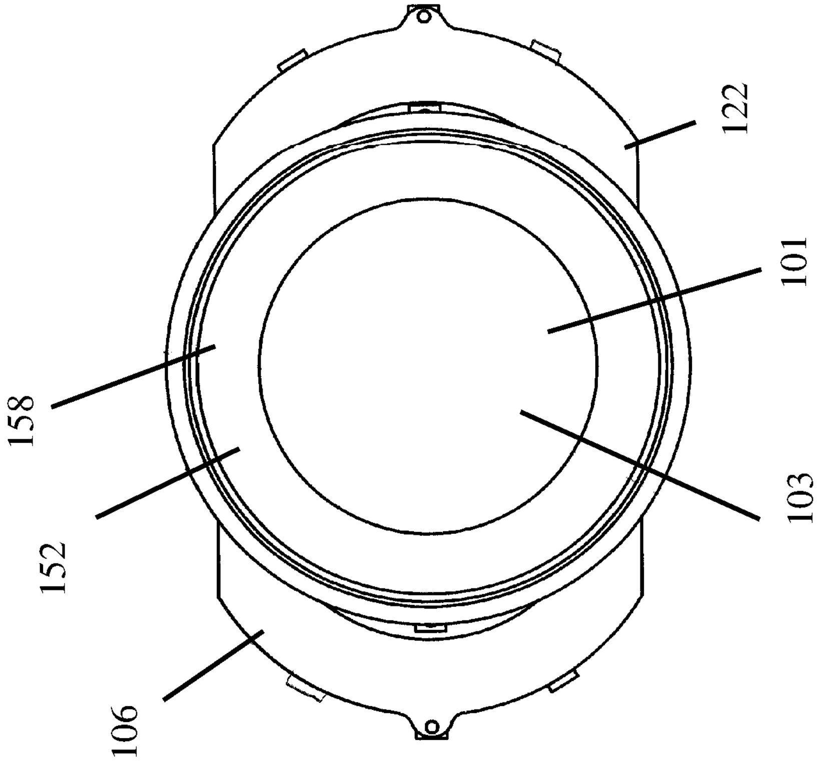
FIG. 11 is a bottom view thereof.
Figure 10:
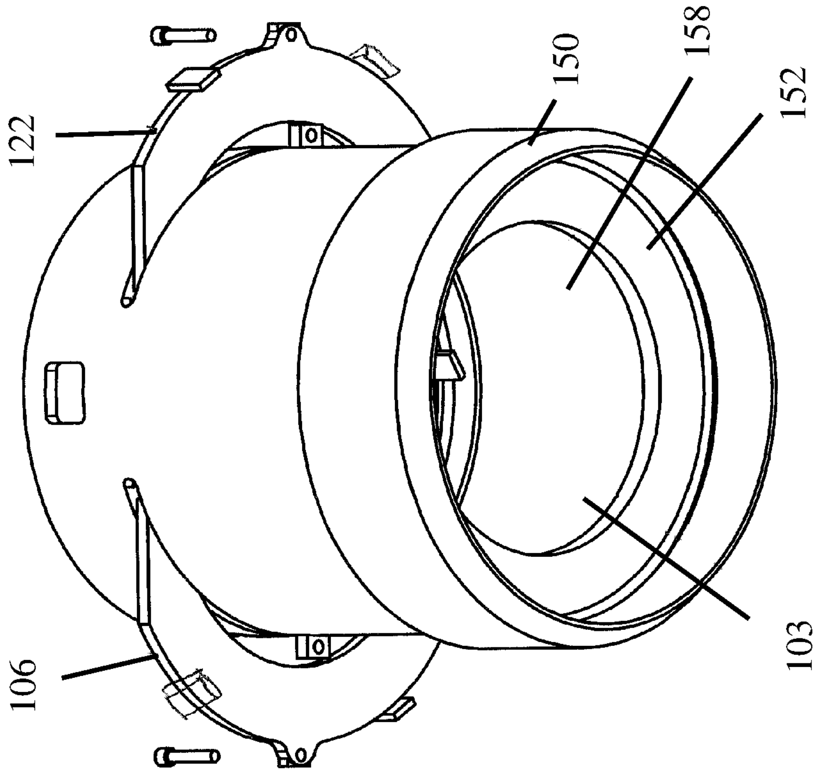
FIG. 10 is a bottom perspective view thereof.

FIGS. 10 and 11 show lower containment lip 152 forming a lower surface for storage of a wiper (not shown). The lower containment lip 152 prevents the wiper from falling through lower aperture 103 to maintain the wiper within housing 100.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for storage of a wiper unit wherein the apparatus is secured to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that inserts into the housing at the first adjustment aperture, the first containment arm adjustable laterally through the first adjustment aperture, wherein inserting the first containment arm into the first adjustment apertures narrows the interior aperture at the first containment arm;

the wiper unit installed within the housing vertically below the first adjustment aperture;

a lock aperture of the first containment arm;

a locking finger that inserts into the lock aperture of the first containment arm, wherein the locking finger inserted into the lock aperture limits lateral movement of the first containment arm; and a stopping finger of the first containment arm extending outward from the first containment arm, the stopping finger located externally of the housing when the first containment arm attaches to the housing, the stopping finger sized not to pass through the first adjustment aperture, the stopping finger configured to contact the exterior of the housing to prevent the first containment arm from completely passing through the first adjustment aperture.

2. The apparatus of claim 1 wherein the stopping finger extends vertically from the first containment arm.

3. The apparatus of claim 2 wherein the stopping finger extends vertically above and below the first containment arm.

4. An apparatus for storage of a wiper unit wherein the apparatus is secured to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that inserts into the housing at the first adjustment aperture, the first containment arm adjustable laterally through the first adjustment aperture, wherein inserting the first containment arm into the first adjustment apertures narrows the interior aperture at the first containment arm;

the wiper unit installed within the housing vertically below the first adjustment aperture;

a lock aperture of the first containment arm;

a locking finger that inserts into the lock aperture of the first containment arm, wherein the locking finger inserted into the lock aperture limits lateral movement of the first containment arm:

wherein securing the first containment arm to the housing with the locking finger limits movement of the first containment arm in relation to the housing.

5. An apparatus for storage of a wiper unit wherein the apparatus is secured to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that inserts into the housing at the first adjustment aperture, the first containment arm adjustable laterally through the first adjustment aperture, wherein inserting the first containment arm into the first adjustment apertures narrows the interior aperture at the first containment arm;

the wiper unit installed within the housing vertically below the first adjustment aperture;

a lock aperture of the first containment arm;

a locking finger that inserts into the lock aperture of the first containment arm, wherein the locking finger inserted into the lock aperture limits lateral movement of the first containment arm:

a first installation finger of the first containment arm, wherein the first installation finger is sized not to pass through the first adjustment aperture, wherein the first installation finger is located on the first containment arm within the interior aperture.

6. An apparatus for storage of a wiper unit wherein the apparatus is secured to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that inserts into the housing at the first adjustment aperture, the first containment arm adjustable laterally through the first adjustment aperture, wherein inserting the first containment arm into the first adjustment apertures narrows the interior aperture at the first containment arm;

the wiper unit installed within the housing vertically below the first adjustment aperture;

a lock aperture of the first containment arm;

a locking finger that inserts into the lock aperture of the first containment arm, wherein the locking finger inserted into the lock aperture limits lateral movement of the first containment arm:

at least one guide located on the interior of the housing, the guide located adjacent to the first adjustment aperture, the guide configured to assist with directing the first containment arm into the housing.

7. An apparatus for storage of a wiper unit to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that attaches to the housing, the first containment arm inserts laterally through the first adjustment aperture, wherein inserting the first containment arm into the first adjustment aperture narrows the interior aperture at the first containment arm;

the wiper unit installed within the housing vertically below the first adjustment aperture;

a stopping finger secured to the first containment arm, the stopping finger sized not to pass through the first adjustment aperture, the stopping finger located externally of the interior aperture, the stopping finger configured to contact an outer surface of the exterior wall to prevent the first containment arm from passing through the first adjustment aperture;

a lock aperture of the first containment arm;

a locking finger that inserts into the lock aperture of the first containment arm, wherein the locking finger inserted into the lock aperture limits lateral movement of the first containment arm;

a lock aperture of the housing wherein the locking finger inserts into the lock aperture of the housing and the lock aperture of the first containment arm to limit lateral movement of the first containment arm.

8. An apparatus for storage of a wiper unit to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that attaches to the housing, the first containment arm inserts laterally through the first adjustment aperture, wherein inserting the first containment arm into the first adjustment aperture narrows the interior aperture at the first containment arm;

the wiper unit installed within the housing vertically below the first adjustment aperture;

a stopping finger secured to the first containment arm, the stopping finger sized not to pass through the first adjustment aperture, the stopping finger located externally of the interior aperture, the stopping finger configured to contact an outer surface of the exterior wall to prevent the first containment arm from passing through the first adjustment aperture;

a first installation finger secured to the first containment arm, wherein the first installation finger is sized not to pass through the first adjustment aperture, wherein the first installation finger is located on the first containment arm within the interior aperture.

9. An apparatus for storage of a wiper unit to a bowl, the apparatus comprising:

a housing configured to store the wiper unit an exterior wall of the housing;

an interior aperture located interior of the exterior wall, wherein the interior aperture defines a vertical axis;

a first adjustment aperture extending laterally through the exterior wall of the housing;

a lower containment lip located vertically below the first adjustment aperture;

a first containment arm that attaches to the housing, the first containment arm inserts laterally through the first adjustment aperture, wherein inserting the first containment arm into the first adjustment aperture narrows the interior aperture at the first containment arm;

the wiper unit installed within the housing vertically below the first adjustment aperture;

a stopping finger secured to the first containment arm, the stopping finger sized not to pass through the first adjustment aperture, the stopping finger located externally of the interior aperture, the stopping finger configured to contact an outer surface of the exterior wall to prevent the first containment arm from passing through the first adjustment aperture;

wherein the lower containment lip narrows the interior aperture to maintaining the wiper unit above the containment lip.

* * * * *